(12) United States Patent
Lee

(10) Patent No.: US 8,525,889 B2
(45) Date of Patent: Sep. 3, 2013

(54) APPARATUS AND METHOD FOR REMOTE CONTROL OF AN IMAGE FORMING DEVICE USING WIRELESS DATA COMMUNICATION

(75) Inventor: Kyoung-jae Lee, Waseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 11/603,186

(22) Filed: Nov. 22, 2006

(65) Prior Publication Data

US 2007/0064113 A1 Mar. 22, 2007

(30) Foreign Application Priority Data

Dec. 13, 2005 (KR) .................. 10-2005-0122432

(51) Int. Cl.
*H04N 5/232* (2006.01)

(52) U.S. Cl.
USPC .............. 348/211.2; 348/211.11; 348/211.99; 358/1.15

(58) Field of Classification Search
USPC ............................ 348/211.3, 211.2; 358/1.15
See application file for complete search history.

(56) References Cited

U.S. PATENT DOCUMENTS

| | | | | |
|---|---|---|---|---|
| 5,490,287 A * | 2/1996 | Itoh et al. | ...................... | 455/41.3 |
| 5,825,988 A * | 10/1998 | Collard et al. | ................ | 358/1.13 |
| 5,873,659 A * | 2/1999 | Edwards et al. | ................. | 400/61 |
| 6,502,164 B1 * | 12/2002 | Choi | .............................. | 711/112 |
| 6,694,317 B1 * | 2/2004 | Stearns et al. | ................. | 709/227 |
| 6,975,421 B1 * | 12/2005 | Hashimoto et al. | ........... | 358/1.16 |
| 7,178,031 B1 * | 2/2007 | Seger | ............................. | 713/182 |
| 7,308,463 B2 * | 12/2007 | Taulbee et al. | ........................ | 1/1 |
| 7,693,962 B2 * | 4/2010 | Serlet et al. | ..................... | 709/219 |
| 2003/0174359 A1 * | 9/2003 | Gomi | ............................ | 358/1.15 |
| 2003/0182389 A1 * | 9/2003 | Edwards | ........................ | 709/213 |
| 2004/0002934 A1 * | 1/2004 | Taulbee et al. | ..................... | 707/1 |
| 2004/0085456 A1 * | 5/2004 | Kwag et al. | .............. | 348/211.11 |
| 2005/0024673 A1 * | 2/2005 | Sakai | ............................ | 358/1.14 |
| 2005/0123270 A1 * | 6/2005 | Okumura | ........................ | 386/46 |
| 2007/0064113 A1 * | 3/2007 | Lee | ........................... | 348/207.99 |
| 2007/0067256 A1 * | 3/2007 | Zayas et al. | ....................... | 707/1 |

FOREIGN PATENT DOCUMENTS

| | | |
|---|---|---|
| CN | 1667643 A | 9/2005 |
| JP | 09-312754 A | 12/1997 |
| JP | 11-203082 A | 7/1999 |
| JP | 2001-018491 | 1/2001 |
| JP | 2001-249780 | 9/2001 |
| JP | 2002-366287 | 12/2002 |
| JP | 2003-248566 | 9/2003 |

* cited by examiner

*Primary Examiner* — Lin Ye
*Assistant Examiner* — Antoinette Spinks
(74) *Attorney, Agent, or Firm* — Roylance, Abrams, Berdo & Goodman, L.L.P.

(57) ABSTRACT

A remote control apparatus and method are provided for controlling an image forming device using wireless data communication by establishing a wireless connection with the image forming device. A wireless interface receives image data stored in a storage medium of an image forming device and transmits a signal requesting an activity for an image corresponding to the received image data, using wireless data communication. A display unit displays an image using the received image data, and a user input unit receives an activity to be performed. By displaying images stored in the image forming device, or an external storage medium, using the wireless remote control apparatus and allowing a user to select an image among the displayed images and request the image forming device to perform an activity, such as a printing or editing activity, a specific activity can be requested from the image forming device without spatial limitation.

25 Claims, 4 Drawing Sheets

APPARATUS AND METHOD FOR REMOTE CONTROL OF AN IMAGE FORMING DEVICE USING WIRELESS DATA COMMUNICATION

CROSS-REFERENCE TO RELATED PATENT APPLICATIONS

This application claims the benefit under 35 U.S.C. §119(a) of Korean Patent Application No. 10-2005-0122432, filed Dec. 13, 2005, in the Korean Intellectual Property Office, the entire disclosure of which is hereby incorporated by reference.

FIELD OF THE INVENTION

The present invention relates to an apparatus and method for controlling an image forming device. More particularly, the present invention relates to a remote control apparatus and method for controlling an image forming device to perform a job, such as image printing and editing, using a device separate from the image forming device.

DESCRIPTION OF THE RELATED ART

In general, an image forming device converts a document edited and desired to be printed by a user using an application program to encoded data and prints the encoded data on a medium in a user readable format.

Recently, image forming devices that can print image data input from a directly connected external storage medium, such as a memory card or universal serial bus (USB) memory stick, or include a bulk hard disk, have become available on the market.

To allow a user to check images stored in a storage medium and select an image to be printed, an image forming device includes a display device, such as a liquid crystal display (LCD), to display the images stored in the storage medium. In addition, to allow the user to check a plurality of images stored in the storage medium at once, the display device has an N-up display function to display a plurality of images on a single screen.

The user can check images displayed on the display device, select a desired image among the displayed images using an input button included in the image forming device, and request an activity, such as printing, editing, deleting, or transferring the selected image.

When a user requests a specific job with regard to images stored in the storage medium using the conventional method described above, the user must stand next to the image forming device and press a button on a user interface. When a plurality of image forming devices are used, each image forming device must be separately controlled, requiring many operations.

SUMMARY OF THE INVENTION

Exemplary embodiments of the present invention provide a remote control apparatus and method for controlling an image forming device using wireless data communication.

According to exemplary embodiments of the present invention, an apparatus is provided for remote control of an image forming device using wireless data communication. The apparatus comprises a wireless interface for receiving image data stored in a storage medium of the image forming device, and transmitting a signal to the image forming device requesting an activity for an image corresponding to the received image data using wireless data communication. The apparatus further comprises a display unit for displaying an image using the received image data, and a user input unit for receiving the activity to be performed with the displayed image.

The activity for the image can comprise at least one of printing, editing, deleting, transferring, television (TV) output, and printing option set-up. The image data received from the image forming device can comprise image data for display.

In an exemplary implementation, the wireless interface can receive image data generated by the image forming device for editing when a user requests an editing activity.

In an exemplary implementation, the wireless interface can receive file system information of the storage medium and transmit a signal to the image forming device requesting data of an image to be displayed among images stored in the storage medium.

In an exemplary implementation, the wireless interface can receive current state information of the image forming device, and the display unit can display a current state of the image forming device using the received information.

Exemplary embodiments of the apparatus can further comprise a universal serial bus (USB) interface for receiving image data from at least one of a host computer and an external storage medium, wherein the wireless interface transmits the received image data to the image forming device.

Exemplary embodiments of the present invention provide an apparatus for remote control of an image forming device using wireless data communication. The apparatus comprises an image forming device selector for selecting an image forming device to be controlled among a plurality of image forming devices, a wireless interface for receiving image data stored in a storage medium of the selected image forming device and transmitting a signal to the selected image forming device requesting an activity for an image corresponding to the received image data using wireless data communication. The apparatus further comprises a display unit for displaying an image using the received image data, and a user input unit for receiving an activity to be performed with the displayed image.

In an exemplary implementation, the wireless interface can perform wireless data communication with a second image forming device of the plurality of image forming devices while an activity requested by a first image forming device is being performed.

In an exemplary implementation, the image forming device selector can select the image forming device to be controlled using information on the current states of the plurality of image forming devices, and information on the requested activity.

In an exemplary implementation, the image forming device selector can select an image forming device not performing a printing activity among the plurality of image forming devices using the current state information of the plurality of image forming devices when a user requests a printing activity. When an error is generated in a printing activity requested from a first image forming device of the plurality of image forming devices, the image forming device selector may receive image data from the first image forming device and transmit the received image data to a second image forming device of the plurality of image forming devices.

The image forming device selector may sequentially select more than two of the plurality of image forming devices so that an activity requested by the user is divided and performed in the more than two of the plurality of image forming devices.

Exemplary embodiments of the present invention provide a method of remote control of an image forming device using wireless data communication. The method comprises receiving image data stored in a storage medium of the image forming device using the wireless data communication connected to the image forming device, displaying an image corresponding to the received image data, receiving an activity for the displayed image, and transmitting a signal requesting the received activity from the image forming device using the wireless data communication.

The activity for the image can comprise at least one of printing, editing, deleting, transferring, television (TV) output, and printing option set-up. The method can further comprise selecting an image forming device to be controlled among a plurality of image forming devices.

In selecting the image forming device, while an activity requested by a first image forming device of the plurality of image forming devices is being performed, a second image forming device may be selected so that an activity can be requested by the second image forming device.

In selecting the image forming device, when an error is generated in a printing activity requested by a first image forming device, a second image forming device may be selected to perform the printing activity.

In selecting the image forming device, an image forming device not performing a printing activity may be selected among the plurality of image forming devices using current state information of the plurality of image forming devices when a user requests the printing activity.

In selecting the image forming device, more than two of the plurality of image forming devices may be sequentially selected so that an activity requested by the user is divided and performed in the more than two of the plurality of image forming devices.

According to exemplary embodiments of the present invention, there is provided a computer readable medium storing a computer readable program for executing the method of remote control of an image forming device using wireless data communication.

BRIEF DESCRIPTION OF THE DRAWINGS

The above and other exemplary features and advantages of the present invention will become more apparent from the following detailed description of certain exemplary embodiments thereof when taken in conjunction with the attached drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
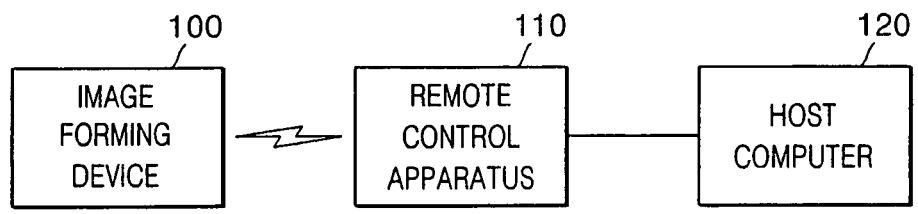
FIG. 1 is a block diagram of a system for remote control of an image forming device according to an exemplary embodiment of the present invention.

FIG. 1 is a block diagram of a system for remote control of an image forming device according to an exemplary embodiment of the present invention. The remote control system illustrated in FIG. 1 comprises an image forming device 100, a remote control apparatus 110, and a host computer 120.

The remote control apparatus 110 transmits/receives data to/from the image forming device 100 using wireless data communication. To enable wireless data communication between the image forming device 100 and the remote control apparatus 110, wireless settings of the two devices 100 and 110 must precede other settings. That is, the image forming device 100 and the remote control apparatus 110 can be wirelessly connected by setting the two devices 100 and 110 to match each other, for example, setting operation mode, network name (SSID), channel, authentication, and encryption.

When a wireless communication operation mode comprises an ad-hoc mode, the image forming device 100 and the remote control apparatus 110 directly transmit/receive data to/from each other. When the wireless communication operation mode comprises an infrastructure mode, the image forming device 100 and the remote control apparatus 110 transmit/receive data to/from each other through an access point (not shown). In infrastructure mode, the image forming device 100 and the remote control apparatus 110 can transmit/receive data to/from other separate device(s) through an Ethernet (not shown) to which the access point is connected.

The remote control apparatus 110 receives image data stored in the image forming device 100 and displays the received images using a display unit (not shown).

A user checks the displayed images and selects one or more of the displayed images using an input button (not shown) included in the remote control apparatus 110. The user then requests a specific activity for the selected image, for example, printing, editing, deletion, transferring, television (TV) output, or printing option set-up of the selected image, using the input button.

The remote control apparatus 110 wirelessly transmits information on the selected image and the requested activity to the image forming device 100, then the image forming device 100 performs the requested activity for the selected image.

The remote control apparatus 110 is connected to the host computer 120 and transmits/receives data to/from the host computer 120. In an exemplary implementation, the connection between the remote control apparatus 110 and the host computer 120 can comprise universal serial bus (USB). The remote control apparatus 110 receives image data stored in the host computer 120 and displays the received images using the display unit.

A user checks the displayed images and selects one or more images using the input button included in the remote control apparatus 110. The user then requests a specific activity for the selected image using the input button.

The remote control apparatus 110 wirelessly transmits information on the selected image and the requested activity to the image forming device 100, then the image forming device 100 performs the requested activity for the selected image. For example, when the user checks the images stored in the host computer 120 using the display unit of the remote control apparatus 110, selects one of the displayed images using the input button of the remote control apparatus 110, and requests a printing activity, the remote control apparatus 110 transmits data of the selected image and printing activity request information to the image forming device 100. The image forming device 100 then prints the image selected by the user using the received image data.

In exemplary implementations, in addition to the host computer 120, an external storage medium, such as a digital camera, a memory card, or a memory stick, can be connected to the remote control apparatus 110.

Figure 6:
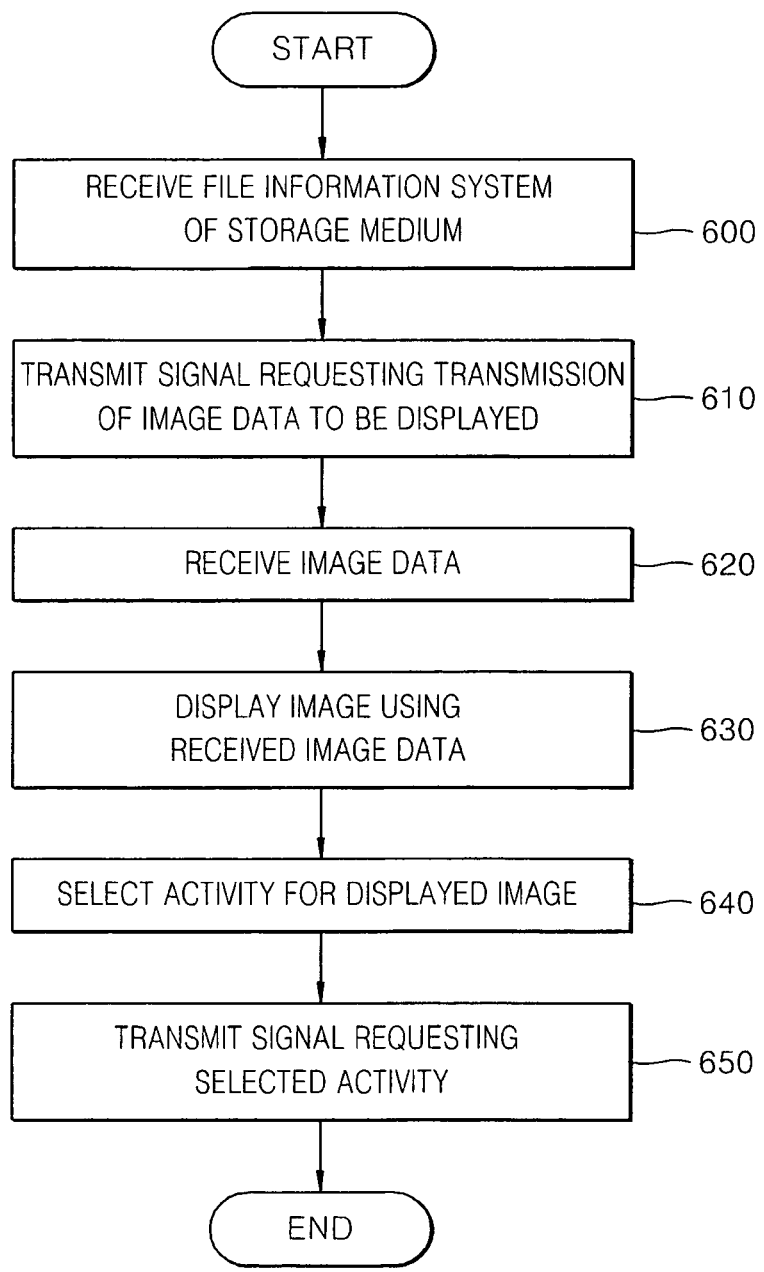
FIG. 6 is a flowchart of a method of remote control of an image forming device according to an exemplary embodiment of the present invention.

A method of controlling an image forming device using wireless data communication according to an exemplary embodiment of the present invention will now be described in more detail with reference to FIGS. 2, 3 and 6.

Figure 2:
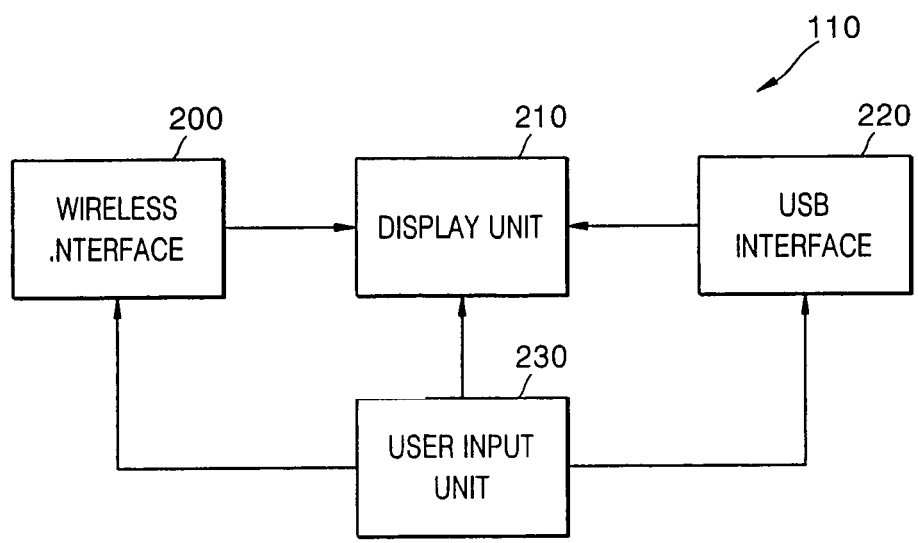
FIG. 2 is a block diagram of a remote control apparatus according to an exemplary embodiment of the present invention.

FIG. 2 is a block diagram of the remote control apparatus 110 according to an exemplary embodiment of the present invention. The remote control apparatus 110 comprises a wireless interface 200, a display unit 210, a user input unit 230, and a USB interface 220. An operation of the remote control apparatus 110 illustrated in FIG. 2 will be described in conjunction with FIG. 6, which is a flowchart of a method of remote control of an image forming device according to an exemplary embodiment of the present invention.

When the remote control apparatus 110 is in communication range of the image forming device 100, the wireless interface 200 enables wireless data communication between the image forming device 100 and the remote control apparatus 110 by setting a wireless connection between them through the above-described procedures.

If a storage medium, for example, a hard disk, a memory card, or a memory stick, is connected to the image forming device 100, the image forming device 100 transmits connection information of the storage medium to the wireless interface 200 of the remote control apparatus 110 using wireless data communication. The wireless interface 200, which has received the storage medium connection information, requests file system information of the connected storage medium from the image forming device 100. The wireless interface 200 receives the file system information of the connected storage medium transmitted by the image forming device 100 in response to the request at step 600. The file system information may be a file allocation table (FAT), the FAT providing a location map of clusters storing files, which is a kind of file allocation table maintained by an operating system (OS) in a storage medium such as a hard disk.

After the wireless interface 200 analyzes the structure of files stored in the storage medium using the received file system information, the wireless interface 200 transmits a signal to the image forming device 100 requesting transmission of image files to be displayed among the data stored in the storage medium at step 610. The wireless interface 200 receives image data transmitted by the image forming device 100 in response to the image file transmission request at step 620.

The display unit 210 displays images stored in the storage medium connected to the image forming device 100 using the received image data at step 630.

The image forming device 100 generates image data for display by converting the image data stored in the storage medium to fit a display device (not shown), then the display device displays the images stored in the storage medium using the generated image data for display. The image data received from the image forming device 100 to the remote control apparatus 110 may be the image data for display generated by the image forming device 100. The display unit 210 of the remote control apparatus 110 can display images without an additional operation for the received image data. Further, the display unit 210 can display more than two of the images stored in the storage medium on a single screen.

The user selects one or more of the displayed images using the user input unit 230. When the display unit 210 displays more than two images on a single screen, if the user selects one image, the selected image can be displayed on the entire screen.

When the user selects an image, the display unit 210 displays an available activity list for the selected image. The user then selects an activity to be performed with the selected image among the displayed activity items using the user input unit 230 at step 640. The available activity list for the selected image can include printing, editing, deleting, transferring, television (TV) output, and printing option set-up. The wireless interface 200 transmits information on the selected image and information on the requested activity to the image forming device 100 at step 650.

When the user requests an editing activity for the selected image, the wireless interface 200 can request that the image forming device 100 transmit image data, and then receive the image data for editing. The user can perform the editing activity, such as zooming, and the edited result is displayed on the display unit 210. To realize the editing activity performed by the user using the remote control apparatus 110 in the image forming device 100, the wireless interface 200 transmits information on the performed editing activity to the image forming device 100.

The image forming device 100 performs the requested activity for the image selected by the user using the received image information and activity information, and transmits information on a proceeding state of the requested activity to the wireless interface 200 of the remote control apparatus 110. The display unit 210 displays a current activity proceeding state of the image forming device 100 using the received proceeding state information.

Figure 3:
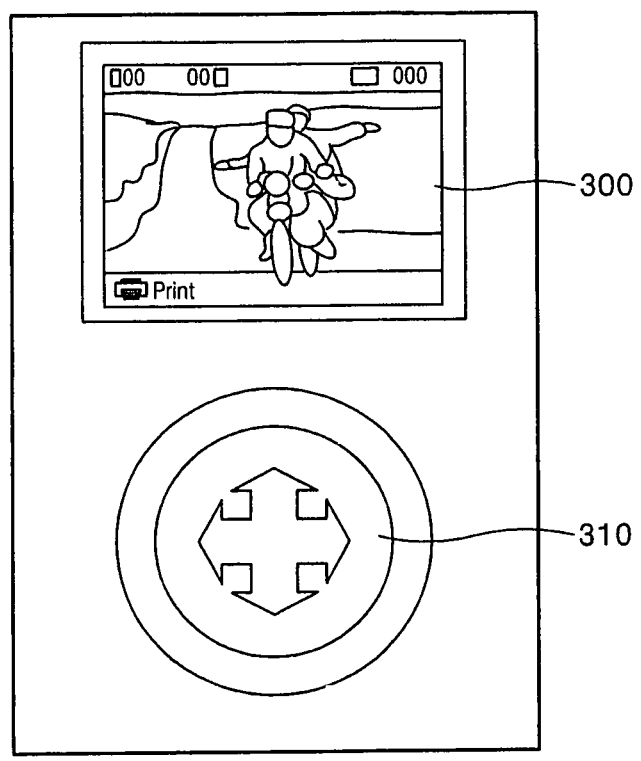
FIG. 3 is a top view of a remote control apparatus according to another exemplary embodiment of the present invention.

FIG. 3 is a top view of the remote control apparatus 110 according to another exemplary embodiment of the present invention. The images stored in the image forming device 100 are displayed on a display unit 300 located at the upper position of the remote control apparatus 110, and the user can select an image and request an activity using up, down, left, and right direction keys of a user input unit 310.

In an exemplary implementation, the USB interface 220 transmits/receives data using a USB connection to the host computer 120. The USB interface 220 can support functions such as personal computer (PC) printing, PictBridge, or mass storage class (MSC). The USB interface 220 receives image data stored in a storage medium (not shown) included or connected to the host computer 120 by performing the same operations as steps 600 through 620 with the host computer 120.

In steps 630 and 640, the display unit 210 displays images stored in the storage medium of the host computer 120 using the received image data, and the user selects a desired image among the displayed images and requests a specific activity for the selected image using the user input unit 230.

When the user requests printing of the selected image, the wireless interface 200 transmits data of the image selected by the user among the received images and a printing request signal to the image forming device 100. Besides the printing activity, the user can store the image data stored in the storage medium of the host computer 120 in the storage medium of the image forming device 100 or delete the data of the selected image using the remote control apparatus 110.

Figure 4:
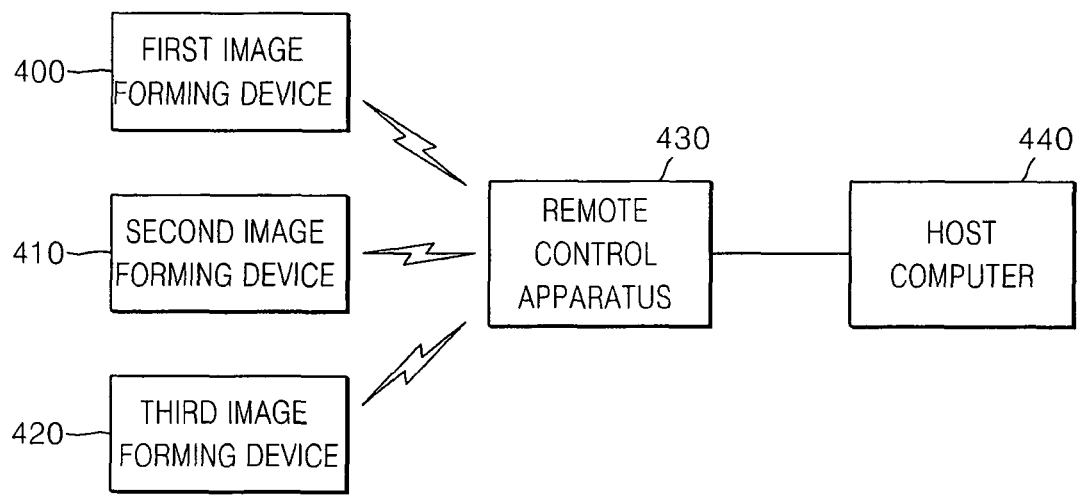
FIG. 4 is a block diagram of a system for remote control of a plurality of image forming devices according to an exemplary embodiment of the present invention.
Figure 5:
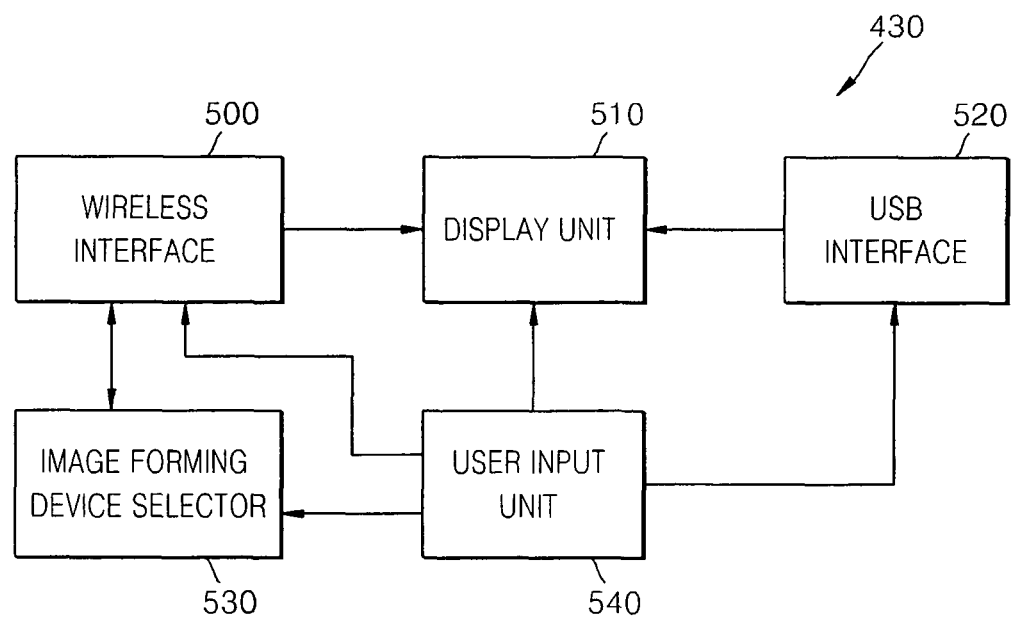
FIG. 5 is a block diagram of a remote control apparatus for control of a plurality of image forming devices according to an exemplary embodiment of the present invention.

A method of controlling a plurality of image forming devices using a remote control apparatus will now be described with reference to FIGS. 4 and 5. FIG. 4 is a block diagram of a system for remote controlling a plurality of image forming devices according to an exemplary embodiment of the present invention. The remote control system illustrated in FIG. 4 comprises a first image forming device 400, a second image forming device 410, a third image forming device 420, a remote control apparatus 430, and a host computer 440.

The user can select and control any one of the first, second, and third image forming devices 400, 410, and 420 using the remote control apparatus 430. When the user selects one of the first, second, and third image forming devices 400, 410, and 420 using the remote control apparatus 430, the remote control apparatus 430 receives image data stored in a storage medium of the selected image forming device from the selected image forming device and displays images stored in the selected image forming device. The user selects one or more images of the displayed images and requests a desired activity, for example, an activity of printing, editing, deleting, transferring, TV output, or printing option set-up The selected image forming device then performs the requested activity for the selected image.

Even while the activity requested by the user using the remote control apparatus 430 is being performed by the selected image forming device, the user can select one of the first, second, and third image forming devices 400, 410, and 420 that is in an idle state or can perform the optimum operation with respect to a requested activity, among the first, second, and third image forming devices 400, 410, and 420, using the remote control apparatus. For example, after requesting the first image forming device 400 to perform a printing activity using the remote control apparatus 430, the user can select the second image forming device 410, select one of images stored therein, display the image on the remote control apparatus 430, and request the second image forming device 410 to perform a printing activity.

Further, when one of the first, second, and third image forming devices 400, 410, and 420 is engaged in an activity, the user can request another image forming device to perform a printing activity for an image stored in the engaged image forming device using the remote control apparatus 430. For example, when the first image forming device 400 is performing an activity, the user can select one or more of images of the first image forming device 400 displayed on the remote control apparatus 430 and request the second image forming device 410 to perform a printing activity for the selected images. The remote control apparatus 430 transmits data of the selected images received from the first image forming device 400 and a printing request signal to the second image forming device 410.

The remote control apparatus 430 can receive image data stored in the host computer 440 and display images of the received image data. The user can then select more than one image from the displayed images and request a desired activity using the remote control apparatus 430. When the activity request is input, the user can select an image forming device for performing the activity among the first, second, and third image forming devices 400, 410, and 420. Alternatively, the user can divide the job into more than two partial activities and request that more than two of the first, second, and third image forming devices 400, 410, and 420 to perform the divided partial activities. In another exemplary embodiment, the remote control apparatus 430 can receive information on current states, performances, or unique functions of the first, second, and third image forming devices 400, 410, and 420, select an image forming device having the optimum condition to perform the requested activity, and request the selected image forming device to perform the activity. Alternatively, the remote control apparatus 430 can select more than two of the first, second, and third image forming devices 400, 410, and 420 to perform the activity so that the activity is divided and performed in the selected more than two of the first, second, and third image forming devices 400, 410, and 420.

The method of controlling the plurality of image forming devices 400, 410, and 420 using the remote control apparatus 430 will now be described in more detail with reference to FIG. 5. FIG. 5 is a block diagram of the remote control apparatus 430 for controlling the plurality of image forming devices 400, 410, and 420 according to an exemplary embodiment of the present invention. The remote control apparatus 430 illustrated in FIG. 5 comprises a wireless interface 500, a display unit 510, an image forming device selector 530, a user input unit 540, and a USB interface 520.

When the remote control apparatus 430 is moved toward the first, second, and third image forming devices 400, 410, and 420, the wireless interface 500 receives image forming device information, such as device identification information (Device ID), from each of the first, second, and third image forming devices 400, 410, and 420, and the display unit 510 displays information on the first, second, and third image forming devices 400, 410, and 420 using the received information.

The USB interface 520 receives information, such as Device ID, from the host computer 440 connected to the remote control apparatus 430 using a USB, and the display unit 510 displays information on the host computer 440 using the received information together with the information on the first, second, and third image forming devices 400, 410, and 420.

When the user selects one of the displayed image forming devices and host computer 400, 410, 420, and 440 using the user input unit 540, either the wireless interface 500 or the USB interface 520 establishes a connection with the selected device and receives image data stored in a storage medium of the selected device. The display unit 510 displays images stored in the selected device using the received image data. The user then selects more than one of the displayed images and inputs a desired activity using the user input unit 540. Since steps performed after the user selects one of the image forming devices 400, 410, and 420 and host computer 440 using the user input unit 540 are similar to steps 600 through 640 described above with reference to FIG. 6, a detailed description of the steps is omitted.

After selecting the image and inputting the desired activity for the selected image, the user selects an image forming device to perform the activity among the first, second, and third image forming devices 400, 410, and 420. The image forming device selector 530 outputs a signal corresponding to the selected image forming device to the wireless interface 500. The wireless interface 500 then establishes a wireless connection with the image forming device selected by the user and transmits data of the selected image and information on the requested activity to the selected image forming device.

If the user does not select any image forming device to perform the activity or selects an optimum image forming device selection mode using the user input unit 540, the wireless interface 500 sequentially establishes a wireless connection with each of the first, second, and third image forming devices 400, 410, and 420 and receives state information of each of the first, second, and third image forming devices 400, 410, and 420. For example, such state information can comprise information on a currently proceeding activity, information on waiting activities, performance information, and information on enable functions. The image forming device selector 530 selects an image forming device having the optimum state for performing the requested activity using the received state information of each of the first, second, and third image forming devices 400, 410, and 420.

For example, among the first, second, and third image forming devices 400, 410, and 420, the image forming device selector 530 can select an image forming device having no currently proceeding activity, an image forming device having no waiting activity, an image forming device enabling to perform the requested activity, or an image forming device having the best performance among image forming devices having no currently proceeding activity. When the user requests a printing activity for a specific image using the remote control apparatus 430, the image forming device selector 530 can select an image forming device having no currently proceeding activity.

The wireless interface 500 receives information on the selected optimum image forming device from the image forming device selector 530, establishes a wireless connection with the selected image forming device, and transmits data of the selected image and information on the requested activity.

The display unit 510 may display information on the image forming device automatically selected by the image forming device selector 530 and display the state of a currently proceeding activity using information received from the selected image forming device.

After selecting an image and a desired activity for the selected image, the user can select a divided execution mode using the user input unit 540 so that the selected activity is divided and performed in more than two of the first, second, and third image forming devices 400, 410, and 420. If the user selects the divided execution mode and two or more image forming devices in which the selected activity is divided and performed, the image forming device selector 530 sequentially transmits a selection signal corresponding to each of the selected more than two image forming devices to the wireless interface 500.

The wireless interface 500 sequentially establishes a wireless connection with the two or more image forming devices selected by the user using the received selection signals and transmits image data and divided activity information to the selected two or more image forming devices. When the user selects the divided execution mode, the user may divide the activity into partial activities and allocate the divided partial activities to each of the selected image forming devices, and the transmitted divided activity information may be generated by the user's allocation.

For example, when the user selects three images using the user input unit 540 and requests the first and second image forming devices 400 and 410 to perform divided printing, the wireless interface 500 establishes a wireless connection with the first image forming device 400 and transmits data of first and second images of the three images and a printing request signal to the first image forming device 400, and after the transmission is finished, the wireless interface 500 establishes a wireless connection with the second image forming device 410 and transmits data of a third image of the three images and a printing request signal to the second image forming device 410. The activity divided and allocated to each of the first and second image forming devices 400 and 410 can be selected by the user as described above and automatically selected by the image forming device selector 530 according to current states of the first and second image forming devices 400 and 410.

When the user does not select image forming devices to perform the divided partial activities or selects an automatic allocation mode after selecting the divided execution mode, the wireless interface 500 sequentially establishes a wireless connection with each of the first, second, and third image forming devices 400, 410, and 420 and receives state information of each of the first, second, and third image forming devices 400, 410, and 420, for example, information on a currently proceeding activity, information on waiting activities, performance information, and information on enable functions. The image forming device selector 530 selects more than two image forming devices having the optimum state for performing the requested divided partial activities using the received state information of each of the first, second, and third image forming devices 400, 410, and 420.

For example, when the user selects three images using the user input unit 540 and requests an automatic allocation divided printing activity, the image forming device selector 530 can select more than two image forming devices having no currently proceeding activity among the first, second, and third image forming devices 400, 410, and 420.

The display unit 510 may display information on the image forming devices in which the divided partial activities are performed and display a current proceeding state of the divided partial activities using information received from the selected image forming devices.

Each image forming device, which has received a activity request from the remote control apparatus 430, performs the requested activity and transmits information on the execution result of the requested activity to the wireless interface 500 of the remote control apparatus 430. The display unit 510 may display the received information on the execution result of the requested activity so that the user can know the execution result of the requested activity even at a location far from each image forming device.

When an error is generated in the execution of the requested activity, the user can confirm activity error generation information through the display unit 510 and request the execution of the error generated activity to other remaining image forming device except for the image forming device in which the error is generated among the first, second, and third image forming devices 400, 410, and 420. In this case, the wireless interface of the remote control apparatus 430 receives image data and information on the requested activity from the image forming device in which the error is generated and transmits the received image data and information on the requested activity to the image forming device selected by the user. The printing error may be generated due to lack of printing paper, a printing paper supply or feeding error, or a printing system error.

For example, when a printing error is generated in the first image forming device 400 to which image printing is requested, the user can select the third image forming device 420 having no currently proceeding printing activity and request the third image forming device 420 to print the error generated image again. In this case, the wireless interface 500 receives data of the printing requested image and information on selected printing options from the first image forming device 400 and transmits the received data and information to the third image forming device 420. The image data received from the first image forming device 400 and transmitted to the third image forming device 420 may be data of a format in which an image forming device can perform a printing activity.

When an error is generated in the execution of the requested activity, if the user does not select any image forming device for performing the requested activity or selects the automatic allocation mode after requesting the execution of the requested activity again, the wireless interface 500 sequentially establishes a wireless connection with each of the first, second, and third image forming devices 400, 410, and 420 and receives state information of each of the first, second, and third image forming devices 400, 410, and 420, for example, information on a currently proceeding activity, information on waiting activities, performance information, and information on enable functions. The image forming device selector 530 selects an image forming device having the optimum state for performing the requested activity using the received state information of each of the first, second, and third image forming devices 400, 410, and 420.

For example, when a printing error is generated in the first image forming device 400 to which image printing is requested, the image forming device selector 530 can automatically select an image forming device having no currently proceeding printing activity among the first, second, and third image forming devices 400, 410, and 420.

Although the case where the remote control apparatus 430 controls three image forming devices 400, 410, and 420 has been described as an example, two, four, or more image forming devices also can be controlled using the remote control apparatus and method according to exemplary embodiments of the present invention.

In addition, the host computer 440 and a plurality of portable storage media, such as a memory card and a memory stick, can be connected to the remote control apparatus 430 at the same time. In this case, the user can select one of the portable storage media using the user input unit 540, check images stored in the selected portable storage medium using the display unit 510, and request a specific activity for the images.

The invention can also be embodied as computer readable code on a computer readable medium. The computer readable medium can comprise any data storage device that can store data which can be thereafter read by a computer system. Examples of a computer readable medium include read-only memory (ROM), random-access memory (RAM), CD-ROMs, magnetic tapes, floppy disks, and optical data storage devices. It is also envisioned that carrier waves (such as data transmission through the Internet) can be utilized as an equivalent to a computer readable medium.

As described above, in an apparatus and method for remote control of an image forming device using wireless data communication, and a method and apparatus for automatically establishing a wireless connection according to exemplary embodiments of the present invention, by displaying images stored in the image forming device or an external storage medium using the remote control apparatus wirelessly connected to the image forming device and allowing a user to select an image among the displayed images and request the image forming device to perform a printing or editing activity, a specific activity can be requested to the image forming device without spatial limitation. Further, by controlling a plurality of image forming devices using a single remote control apparatus, an image forming device can be selected to perform an activity according to current states of the plurality of image forming devices, and the activity can be divided.

While the present invention has been particularly shown and described with reference to certain exemplary embodiments thereof, it will be understood by those of ordinary skill in the art that various changes in form and detail may be made therein without departing from the spirit and scope of the present invention as defined by the following claims and equivalents thereof.

What is claimed is:

1. An apparatus for remotely controlling an image forming device using wireless data communication, the apparatus comprising:
   a wireless interface for providing a wireless communication interface used to transmit and receive image data to and from the image forming device;
   a display unit for displaying an image and the image data received from the image forming device; and
   a user input unit for selecting at least one of a plurality of pieces of image data information received through the wireless data communication, and selecting image activity information comprising at least one of the activities of printing, editing, transferring, deleting, television outputting, and printing option setting up with respect to the image displayed on the display unit;
   wherein the wireless interface requests from the image forming device file system information stored in a storage medium that is installed in or is directly connected to the image forming device, receives the file system information from the image forming device, transmits the image data information selected through the user input unit by using the file system information to the image forming device, receives image data corresponding to the transmitted image data information from the image forming device, transmits a signal to the image forming device requesting the activity corresponding to the image activity information selected by the user input unit and receives information on a proceeding state of activity corresponding to the signal from the image forming apparatus;
   wherein the display unit displays a current activity proceeding state of the image forming device using the received proceeding state information; and
   wherein the wireless interface, the display unit and the user input unit are integrated in one device, the device being portable.

2. The apparatus of claim 1, wherein the received image data comprises image data for display.

3. The apparatus of claim 1, wherein the wireless interface receives image data generated by the image forming device for editing when a user requests an editing activity.

4. The apparatus of claim 1, wherein the wireless interface receives file system information of the storage medium and transmits a signal to the image forming device requesting data of an image to be displayed among images stored in the storage medium.

5. The apparatus of claim 1, wherein the wireless interface receives current state information of the image forming device, and the display unit displays a current state of the image forming device using the received information.

6. The apparatus of claim 1, further comprising a universal serial bus (USB) interface for receiving other image data stored in at least one of a host computer and an external storage medium, wherein the wireless interface transmits the other image data to the image forming device.

7. The apparatus of claim 6, further comprising:
a wireless communication operation mode;
wherein the wireless communication mode comprises an ad-hoc mode; and
wherein the image forming device and the remote control apparatus directly transmit/receive data to/from each other.

8. The apparatus of claim 6, further comprising:
a wireless communication operation mode;
wherein the wireless communication mode comprises an infrastructure mode; and
wherein the image forming device and the remote control apparatus transmit/receive data to/from each other through an access point.

9. The apparatus of claim 8, wherein the remote control apparatus can transmit/receive data to/from other devices through an Ethernet to which the access point is connected.

10. An apparatus for remotely controlling an image forming device using wireless data communication, the apparatus comprising:
an image forming device selector for selecting an image forming device to be remotely controlled from among a plurality of image forming devices;
a wireless interface for providing a wireless communication interface used to transmit and receive image data to and from the selected image forming device;
a display unit for displaying an image and the image data received from the image forming device; and
a user input unit for selecting at least one of a plurality of pieces of image data information received through the wireless data communication, and selecting image activity information comprising at least one of the activities of printing, editing, transferring, deleting, television outputting, and printing option setting up with respect to the image displayed on the display unit;
wherein the wireless interface requests from the image forming device file system information stored in a storage medium that is installed in or is directly connected to the image forming device, receives the file system information from the image forming device, transmits the image data information selected through the user input unit by using the file system information to the image forming device, receives image data corresponding to the transmitted image data information from the image forming device, and transmits a signal to the image forming device requesting the activity corresponding to the image activity information selected by the user input unit;
and receives information on a proceeding state of activity corresponding to the signal from the image forming apparatus;
wherein the display unit displays a current activity proceeding state of the image forming device using the received proceeding state information; and
wherein the wireless interface, the display unit and the user input unit are integrated in one device, the device being portable.

11. The apparatus of claim 10, wherein the wireless interface can perform wireless data communication with a second image forming device while an activity requested by a first image forming device is being performed.

12. The apparatus of claim 10, wherein the image forming device selector selects the image forming device to be controlled using information on current states of the plurality of image forming devices and information on the requested activity.

13. The apparatus of claim 10, wherein the image forming device selector selects an image forming device not performing a printing activity among the plurality of image forming devices using the current state information of the plurality of image forming devices when a user requests a printing activity.

14. The apparatus of claim 10, wherein, when an error is generated in a printing activity requested from a first image forming device, the image forming device selector receives image data from the first image forming device and transmits the received image data to a second image forming device.

15. The apparatus of claim 10, wherein the image forming device selector sequentially selects more than two of the plurality of image forming devices so that an activity requested by the user is divided and performed in the more than two of the plurality of image forming devices.

16. A method of remotely controlling an image forming device using wireless data communication through a wireless interface, the method comprising:
requesting from the image forming device file system information stored in a storage medium that is installed in or is directly connected to the image forming device through wireless data communication, and receiving the file system information from the image forming device;
requesting the image forming device for image data corresponding to an image to be displayed by using the file system information and receiving the requested image data from the image forming device;
displaying the image corresponding to the received image data on a display unit;
selecting image activity information comprising at least one of the activities of printing, editing, transferring, deleting, television outputting, and printing option setting up with respect to the displayed image, through a user input unit; and
transmitting the selected image activity information to the image forming device through the wireless data communication; and
receiving information on a proceeding state of activity corresponding to the transmitted image activity information from the image forming apparatus;
wherein the display unit displays a current activity proceeding state of the image forming device using the received proceeding state information; and
wherein the wireless interface, the display unit and the user input unit are integrated in one device, the device being portable.

17. The method of claim 16, in the selecting of the image forming device, while an activity requested by a first image forming device is being performed, a second image forming device is selected so that an activity can be requested by the second image forming device.

18. The method of claim 16, wherein, in the selecting of the image forming device, when an error is generated in a printing activity requested by a first image forming device, a second image forming device is selected to perform the printing activity.

19. The method of claim 16, wherein, in the selecting of the image forming device, an image forming device not performing a printing activity is selected among the plurality of image forming devices using current state information of the plurality of image forming devices when a user requests a printing activity.

20. The method of claim 16, wherein, in the selecting of the image forming device, more than two of the plurality of image forming devices are sequentially selected so that an activity requested by the user is divided and performed in the selected more than two of the plurality of image forming devices.

21. The method of claim 16, wherein, if an external storage medium is connected to the image forming device, the image forming device transmits connection information of the storage medium.

22. The method of claim 21, wherein the connection information comprises a file allocation table (FAT) comprising a location map of clusters storing files.

23. A method of remotely controlling an image forming device using wireless data communication, the method comprising:

requesting from the image forming device file system information stored in a storage medium that is installed in or is directly connected to the image forming device through a wireless communication interface, and receiving the file system information from the image forming device, under control of a remotely control apparatus;

requesting the image forming device for image data corresponding to an image to be displayed by using the file system information and receiving the requested image data from the image forming device, under control of a remotely control apparatus;

displaying the image corresponding to the received image data on a display unit, under control of a remotely control apparatus;

selecting image activity information comprising at least one of the activities of printing, editing, transferring, deleting, television outputting, and printing option setting up with respect to the displayed image, through a user input unit under control of a remotely control apparatus;

transmitting the selected image activity information to the image forming device through the wireless data communication; and receiving information on a proceeding state of activity corresponding to the transmitted image activity information from the image forming apparatus;

wherein the display unit displays a current activity proceeding state of the image forming device using the received proceeding state information; and wherein the wireless interface, the display unit and the user input unit are integrated in one device, the device being portable.

24. A non-transitory computer readable medium for storing a computer readable program and providing remote control of an image forming device by using wireless data communication, comprising:

a first set of instructions for controlling a wireless interface that requests from the image forming device file system information stored in a storage medium that is installed in or is directly connected to the image forming device through wireless data communication, and receives the file system information from the image forming device;

a second set of instructions for controlling the wireless interface that requests the image forming device for image data corresponding to an image to be displayed by using the file system information and receives the requested image data from the image forming device;

a third set of instructions for controlling display unit that displays an image corresponding to the received image data;

a fourth set of instructions for controlling a user input unit that selects image activity information comprising at least one of the activities of printing, editing, transferring, deleting, television outputting, and printing option setting up with respect to the displayed image; and a fifth set of instructions for controlling the wireless interface that transmits the selected image activity information to the image forming device by using wireless data communication and receives information on a proceeding state of activity corresponding to the transmitted image activity information from the image forming apparatus;

wherein the display unit displays a current activity proceeding state of the image forming device using the received proceeding state information; and wherein the wireless interface, the display unit and the user input unit are integrated in one device, the device being portable.

25. An image forming apparatus for performing an image forming activity using wireless data communication with a remote control apparatus, the apparatus comprising:

an image data transmission and reception module for, if the remote control apparatus requests for file system information stored in a storage medium in which image data is stored, transmitting the file system information to the remote control apparatus in response to the request, if the remote control apparatus selects image data using the file system information and requests for the image data, obtaining the image data stored in the storage medium and transmitting the image data to the remote control apparatus; and an image activity unit for receiving image activity information comprising at least one of the activities of printing, editing, deleting, television outputting, and printing option setting up with respect to the image data from the remote control apparatus, performing an activity on the image data according to the image activity information, and forming an image;

wherein the remote control apparatus receives information on a proceeding state of activity corresponding to a signal, transmitted by the remote control apparatus to the image forming device requesting the activity corresponding to a selected image activity information, from the image forming apparatus; and wherein a display unit of the remote control apparatus displays a current activity proceeding state of the image forming device using the received proceeding state information.

* * * * *